US010082685B2

(12) United States Patent
Guzzon

(10) Patent No.: US 10,082,685 B2
(45) Date of Patent: Sep. 25, 2018

(54) WAVELENGTH LOCKING FILTER

(71) Applicant: Aurrion, Inc., Goleta, CA (US)

(72) Inventor: Robert Silvio Guzzon, Santa Barbara, CA (US)

(73) Assignee: Aurrion, Inc., Goleta, CA (US)

(*) Notice: Subject to any disclaimer, the term of this patent is extended or adjusted under 35 U.S.C. 154(b) by 0 days.

(21) Appl. No.: 15/817,924

(22) Filed: Nov. 20, 2017

(65) Prior Publication Data

US 2018/0074350 A1 Mar. 15, 2018

Related U.S. Application Data

(63) Continuation of application No. 15/079,590, filed on Mar. 24, 2016, now Pat. No. 9,835,881.

(Continued)

(51) Int. Cl.
*G02F 1/035* (2006.01)
*G02F 1/025* (2006.01)
(Continued)

(52) U.S. Cl.
CPC ......... *G02F 1/025* (2013.01); *G02B 6/29338* (2013.01); *G02B 6/29341* (2013.01); *G02B 6/29383* (2013.01); *G02F 1/0121* (2013.01); *G02F 1/0147* (2013.01); *G02F 2001/0156* (2013.01)

(58) Field of Classification Search
None
See application file for complete search history.

(56) References Cited

U.S. PATENT DOCUMENTS 6,580,851 B1 6/2003 Vahala et al.
6,839,482 B2* 1/2005 Margalit ............ G02B 6/29319
385/14

(Continued)

FOREIGN PATENT DOCUMENTS

EP 1793249 A2 6/2007

OTHER PUBLICATIONS

"U.S. Appl. No. 15/079,590, Non Final Office Action dated Mar. 22, 2017", 11 pgs.

(Continued)

*Primary Examiner* — Tina Wong
(74) *Attorney, Agent, or Firm* — Schwegman Lundberg & Woessner, P.A.

(57) ABSTRACT

An optical system can automatically lock an adjustable spectral filter to a first wavelength of an incoming light signal, and can automatically filter an additional incoming light signal at the first wavelength. A tunable filter can have a filtering spectrum with an adjustable peak wavelength and increasing attenuation at wavelengths away from the adjustable peak wavelength. The tunable filter can receive first input light, having a first wavelength, and can spectrally filter the first input light to form first output light. A detector can detect at least a fraction of the first output light. Circuitry coupled to the detector and the tunable filter can tune the tunable filter to maximize a signal from the detector and thereby adjust the peak wavelength to match the first wavelength. The tunable filter further can receive second input light and spectrally filter the second input light at the first wavelength.

20 Claims, 7 Drawing Sheets

Related U.S. Application Data

(60) Provisional application No. 62/137,982, filed on Mar. 25, 2015.

(51) Int. Cl.
*G02B 6/293* (2006.01)
*G02F 1/01* (2006.01)
*G02F 1/015* (2006.01)

(56) References Cited

U.S. PATENT DOCUMENTS

| | | | |
|---|---|---|---|
| 6,959,028 B2 | 10/2005 | Jones | |
| 7,177,503 B1 | 2/2007 | Dimmick et al. | |
| 7,565,045 B2 | 7/2009 | Suzuki | |
| 8,897,606 B2* | 11/2014 | Asghari | G02F 1/2257 385/2 |
| 9,787,405 B2* | 10/2017 | Baehr-Jones | H04B 10/516 |
| 9,793,684 B2* | 10/2017 | Takabayashi | H01S 5/142 |
| 9,835,881 B2 | 12/2017 | Guzzon | |
| 9,948,389 B2* | 4/2018 | D'Errico | H04B 10/07955 |
| 2003/0072534 A1 | 4/2003 | Bona et al. | |
| 2005/0013538 A1* | 1/2005 | Yamazaki | G02B 6/12007 385/27 |
| 2005/0068602 A1* | 3/2005 | Tormen | G02B 6/12004 359/246 |
| 2006/0222038 A1* | 10/2006 | Yamazaki | H01S 5/0612 372/94 |
| 2009/0046748 A1* | 2/2009 | Kato | H01S 5/026 372/20 |
| 2009/0122817 A1* | 5/2009 | Sato | G02B 6/12007 372/20 |
| 2016/0209593 A1* | 7/2016 | Jiang | G02B 6/2773 |
| 2016/0282640 A1 | 9/2016 | Guzzon | |
| 2017/0149508 A1* | 5/2017 | Baehr-Jones | H04B 10/516 |
| 2018/0019821 A1* | 1/2018 | Baehr-Jones | H04B 10/516 |
| 2018/0020272 A1* | 1/2018 | Testa | H04Q 11/0005 |

OTHER PUBLICATIONS

"U.S. Appl. No. 15/079,590, Notice of Allowance dated Aug. 11, 2017", 9 pgs.

"U.S. Appl. No. 15/079,590, Response filed Jun. 6, 2017 to Non Final Office Action dated Apr. 6, 2017", 8 pgs.

"European Application Serial No. 16000710.0, Extended European Search Report dated Aug. 8, 2016", 9 pgs.

"European Application Serial No. 16000710.0, Response filed Feb. 28, 2017 to Search Report/Opinion Due dated Oct. 4, 2016", 15 pgs.

* cited by examiner

WAVELENGTH LOCKING FILTER

CROSS-REFERENCE TO RELATED APPLICATION

This application claims the benefit of U.S. patent application Ser. No. 15/079,590, filed Mar. 24, 2016, which claims the benefit of U.S. Provisional Application No. 62/137,982, filed on Mar. 25, 2015, all of which are incorporated herein by reference in their entirety.

TECHNICAL FIELD

The subject matter disclosed herein generally relates to spectral filtering of optical signals. Specifically, the present disclosure addresses automatically locking an adjustable spectral filter to a first wavelength of an incoming light signal, and automatically filtering an additional incoming light signal at the first wavelength.

BACKGROUND

In some technical fields, such as telecommunications, it can be desirable to spectrally filter one light signal to match a wavelength of another light signal.

BRIEF DESCRIPTION OF THE DRAWINGS

The figures of the accompanying drawings provide non-limiting and non-exhaustive examples of some embodiments. Like reference numerals refer to like parts throughout the various view unless otherwise specified. The following figures are not drawn to scale.

DETAILED DESCRIPTION

An optical system can automatically lock an adjustable spectral filter to a first wavelength of an incoming light signal, and can automatically filter an additional incoming light signal at the first wavelength. In some examples, a tunable source can automatically lock to the spectral filter, and produce light at the first wavelength. Such an optical system can be simpler than a comparable system that uses a detection system to sense the first wavelength of the incoming light signal, and a separate tuning system to actively tune a downstream spectral filter or a tunable source to match the first wavelength.

Figure 1:
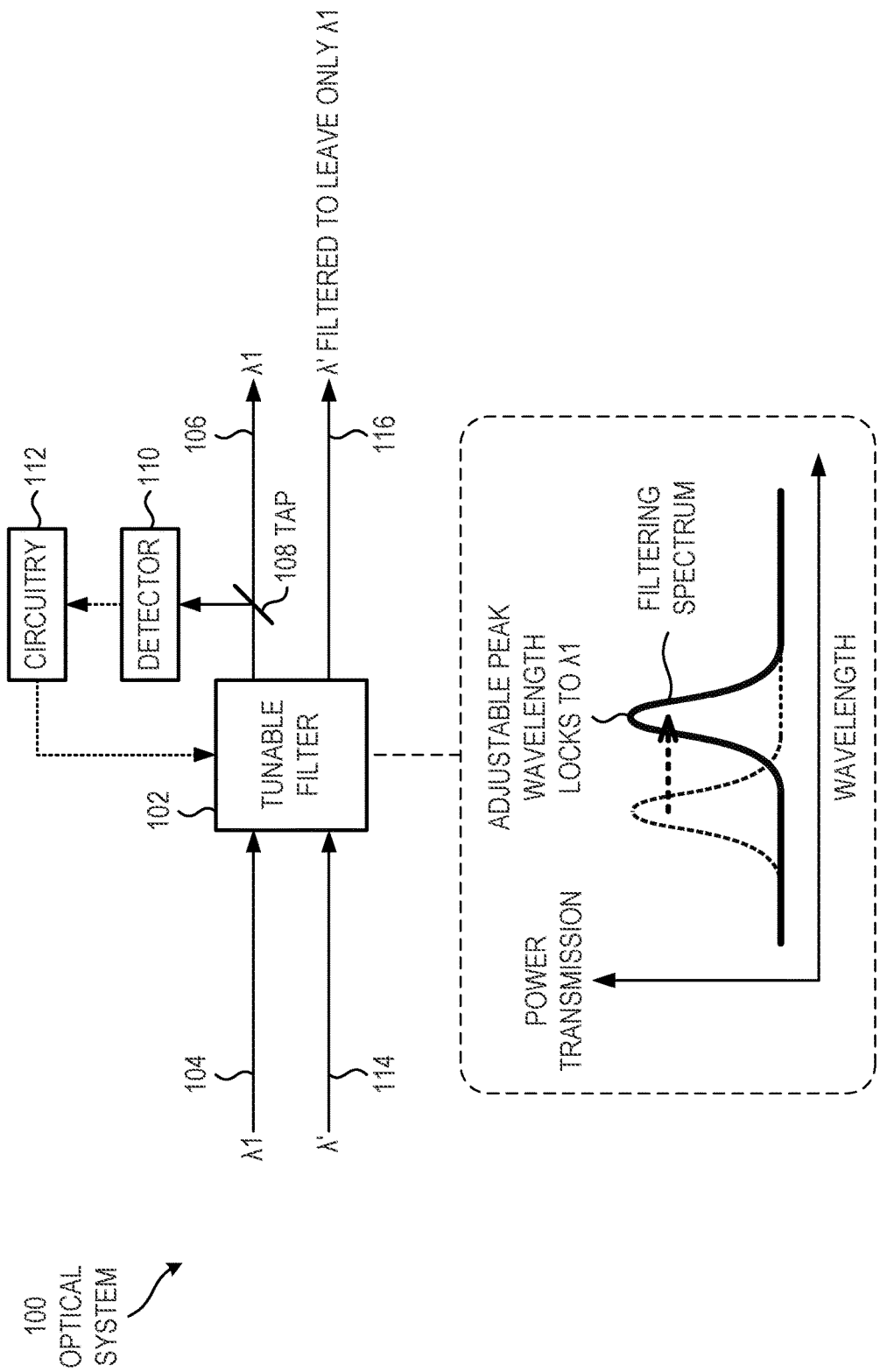
FIG. 1 is a block diagram showing an example of an optical system that can automatically spectrally filter one light signal to match a wavelength of another light signal, in accordance with some embodiments.

FIG. 1 is a block diagram showing an example of an optical system 100 that can automatically spectrally filter one light signal to match a wavelength of another light signal, in accordance with some embodiments. The configuration of FIG. 1 is but one example of an optical system 100 that can automatically spectrally filter one light signal to match a wavelength of another light signal; other suitable configurations can also be used.

A tunable filter 102 can have a filtering spectrum with an adjustable peak wavelength and increasing attenuation at wavelengths away from the adjustable peak wavelength. FIG. 1 shows an example of a filtering spectrum for the tunable filter 102, in which a power transmission curve appears as a peak at an adjustable peak wavelength, and decreasing power transmission (e.g., increasing attenuation) away from the adjustable peak wavelength. The power transmission curve can include sloping sides on either side of the peak. The peak wavelength can be locked to a wavelength of a light signal, as explained below, so that the whole power transmission curve (e.g., the peak wavelength and the sloping sides) can shift upward and downward in wavelength in real time, as needed.

The tunable filter 102 can receive first input light 104, having a first wavelength denoted as $\lambda 1$ in FIG. 1. The first wavelength $\lambda 1$ can vary over time. The tunable filter 102 can spectrally filter the first input light 104 to form first output light 106. The optical system 100 can be configured so that the tunable filter 102 automatically follows the first wavelength $\lambda 1$. As a result, the first output light 106 can have a wavelength that matches that of the first input light 104, namely $\lambda 1$.

A power tap 108 can direct a fraction of the first output light 106 to a detector 110. The fraction is between 0% and 100%, and can be on the order of 0.1%, 0.5%, 1%, 2%, 5%, 10%, or 20%, among other values. In general, the fraction should be large enough so that the detector and circuitry can function with a sufficiently large signal-to-noise ratio, but small enough so that the remaining first output light 106 can perform its intended task, such as providing data to a particular telecommunications channel. In some examples, the fraction can be 100%, where all of the first output light 106 is directed onto the detector 110. For these examples, the power tap 108 can be absent, or can be a coupling between a waveguide and the detector 110.

Circuitry 112 coupled to the detector 110 and the tunable filter 102 can tune the tunable filter 102 to maximize a signal from the detector 110 and thereby adjust the peak wavelength to match the first wavelength $\lambda 1$. The circuitry 112 can be processor-based, can be formed from discrete components, or can be a combination of processor-based and discrete. In some examples, the circuitry 112 can apply a dither to the tunable wavelength, so that the wavelength of the output light 106 varies with a periodic oscillation. In these examples, the circuitry 112 can sense a polarity of the periodic oscillation, can use the polarity to determine which side of the peak wavelength the output light 106 is on, and can form a servo that locks the peak wavelength of the tunable filter 102 to the first wavelength $\lambda 1$ of the first input light 104. In other examples, the circuitry 112 can dither the peak wavelength of the tunable filter 102. In still other examples, the circuitry 112 can apply a hill-climbing algorithm to set the peak wavelength to match the first wavelength λ1.

The tunable filter 102 can further receive second input light 114, and can spectrally filter the second input light 114 to form second output light 116. The second output light can be spectrally filtered with a peak at the first wavelength λ1 and increasing attenuation at wavelengths away from the first wavelength λ1. In FIG. 1 and subsequent figures, the second input light 114 (before filtering) has a wavelength or wavelength range denoted by λ', and the second output light 116 (after filtering) has a wavelength denoted by "λ' filtered to leave only λ1".

Figure 2:
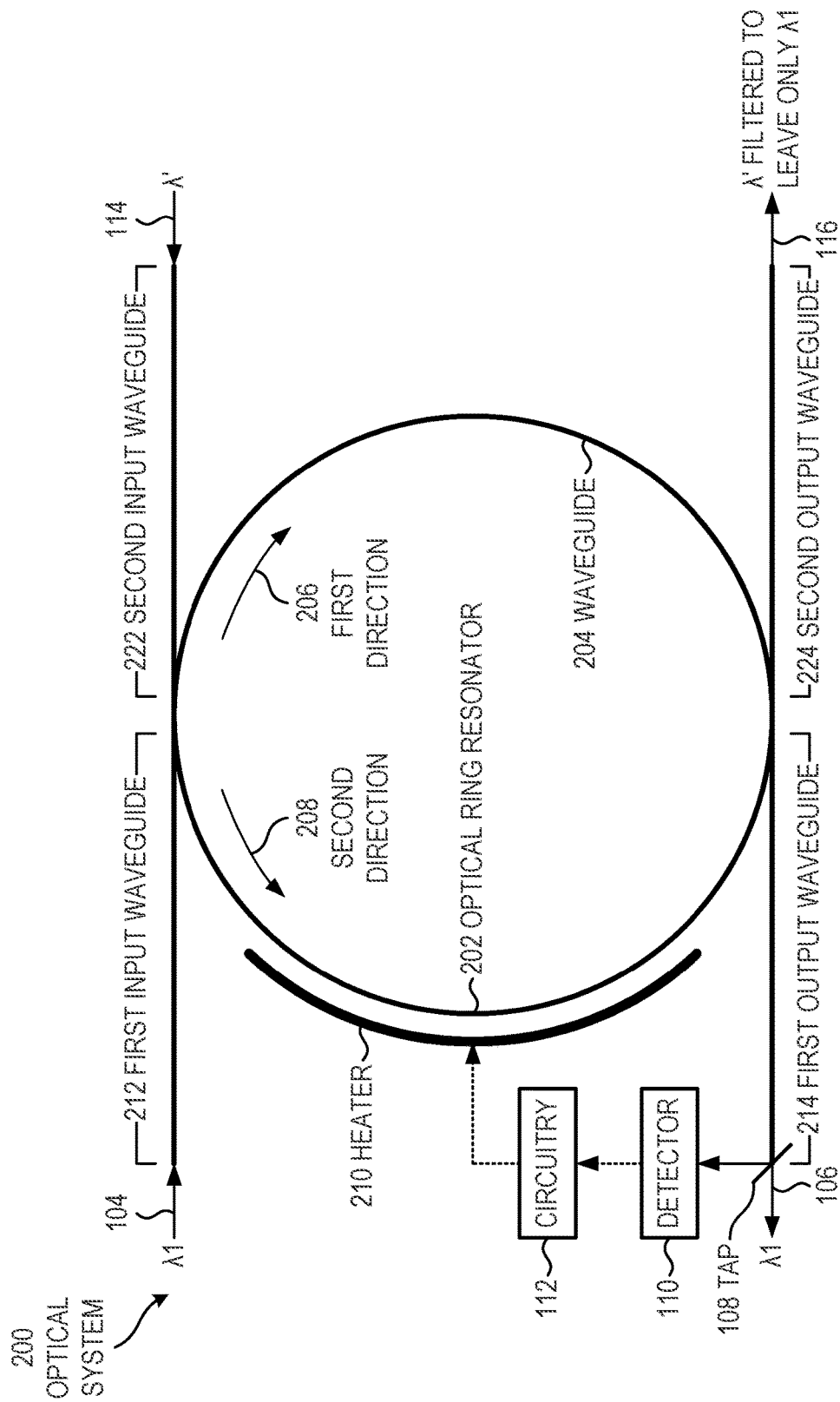
FIG. 2 is a block diagram showing a specific configuration of the optical system of FIG. 1, including an optical ring resonator, a power tap, a detector, circuitry, and a heater, in accordance with some embodiments.

FIG. 2 is a block diagram showing a specific configuration of the optical system of FIG. 1, including an optical ring resonator, a power tap, a detector, circuitry, and a heater, in accordance with some embodiments. The configuration of FIG. 2 is but one example; other suitable configurations can also be used.

In the optical system 200 of FIG. 2, the tunable filter is an optical ring resonator 202 formed from at least one waveguide 204 arranged in a closed path. The optical ring resonator 202 can propagate light in a first direction 206 around the closed path (e.g. clockwise in FIG. 2) and a second direction 208, opposite the first direction 206 (e.g., counterclockwise in FIG. 2), around the closed path.

The resonance of an optical ring resonator, such as 202, is a function of an optical path length around the optical ring resonator. The resonator shows relatively high resonance for optical path lengths that are an integral number (e.g., an integer-valued number) of wavelengths, and relatively low resonance for optical path lengths away from the integral number of wavelengths. In other words, a given optical ring resonator shows resonance at wavelengths for which an integral number "fit" within the optical path of the optical ring resonator. The spacing between adjacent resonant wavelengths is referred to as a free spectral range. In some examples, the free spectral range can be greater than a specified range of wavelengths for the first input light 104. For example, the specified range of wavelength can correspond to a range of wavelengths of a channel in a telecommunications system, or a specified range of wavelengths within a particular channel.

A first input waveguide 212 can inject the first input light 104, having a first wavelength λ1, into the optical ring resonator 202 in the first direction 206. A first output waveguide 214 can extract the first output light 106 from the optical ring resonator 202 in the first direction 206. A second input waveguide 222 can inject the second input light 114 into the optical ring resonator 202 in the second direction 208. A second output waveguide 224 can extract the second output light 116 from the optical ring resonator 202 in the second direction 208. In some examples, at least one of the input or output waveguides is a discrete waveguide. In some examples, the input and/or output waveguides are constructed as a single waveguide with a coupling region parallel to or merging with the waveguide 204 of the optical ring resonator 202. The power tap 108 can extract a portion of the first output light 106 from the first output waveguide 214. The detector 110 and circuitry 112 function the same as the corresponding elements shown in FIG. 1.

In the example of FIG. 2, the tunable filter can further include a material having a temperature-dependent refractive index disposed in an optical path of the optical ring resonator 202. In the example of FIG. 2, the tunable filter can further include a heater 210 that can controllably heat at least a portion of the material, and thereby change an optical path length around the optical ring resonator and thereby change a resonant wavelength of the optical ring resonator. In some examples, the tunable filter can further include multiple heaters disposed around the optical ring resonator 202, all of which are coupled to the circuitry 112. The circuitry 112 can further tune the tunable filter by heating the portion of the material.

In other configurations, the tunable filter can include other ways to adjust the optical path length of the optical ring resonator 202. For example, the tunable filter can use a carrier injection, such as from a forward-biased PIN diode, to induce a change in refractive index via free-carrier absorption from a material disposed in the waveguide of the optical ring resonator 202. Carrier injection is especially well-suited for III-V semiconductor materials. Other suitable ways to adjust the optical path length can also be used.

In some examples, some or all of the elements of FIG. 2 are formed at the wafer level, rather than as discrete components that are assembled after they have been manufactured. In some examples, a top silicon layer of a silicon-on-insulator wafer can shaped to define the optical ring resonator 202, the first and second input waveguides 212, 222, and the first and second output waveguides 214, 224. Other suitable substrate materials can also be used. In some examples, additional material or elements can be deposited or grown on the substrate. For example, the material having a temperature-dependent refractive index can be deposited or grown in the waveguide 204 of the optical ring resonator 202.

Figure 3:
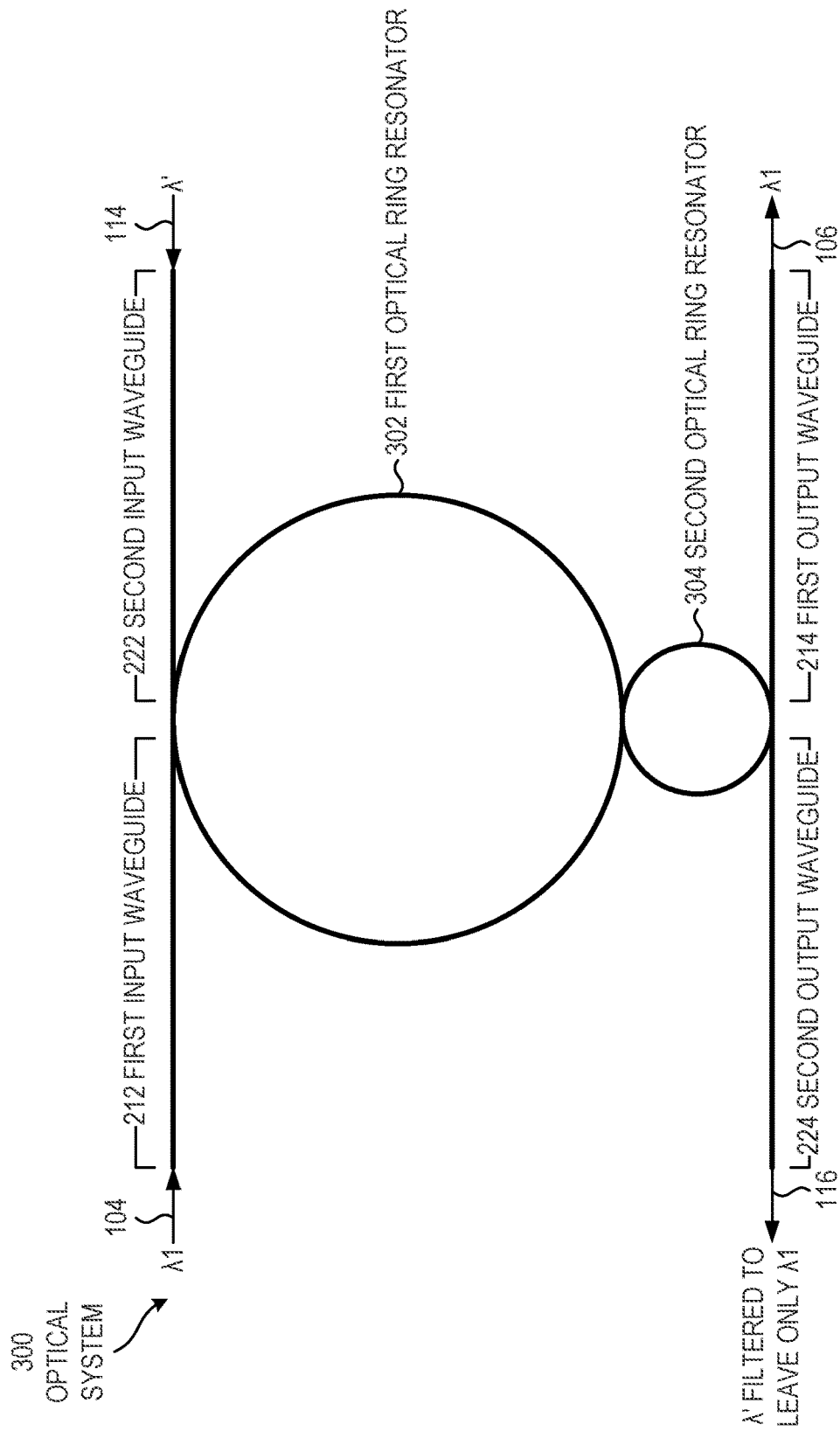
FIG. 3 is a block diagram showing an alternate configuration of the optical system of FIG. 1, including multiple optical ring resonators arranged in series, in accordance with some embodiments.

FIG. 3 is a block diagram showing an alternate configuration of the optical system of FIG. 1, including multiple optical ring resonators arranged in series, in accordance with some embodiments. Optical system 300 can include a plurality of optical ring resonators, each of the plurality of optical ring resonators being formed from at least one waveguide arranged in a respective closed path. The configuration of FIG. 3 is but one example; other suitable configurations can also be used.

Compared with the optical system 200 of FIG. 2, which includes a single optical ring resonator 202, the optical system 300 of FIG. 3 includes a first optical ring resonator 302 and a second optical ring resonator 304 connected in series between the input waveguides 212, 222 and the output waveguides 214, 224. Cascading one or more optical ring resonators in series can increase the free spectral range of the combination of resonators, which can be desirable in some cases. In some examples, cascading the optical ring resonators in series, and thereby increasing the free spectral range of the combination of resonators, can be referred to as a Vernier approach. In some configurations, more than two optical ring resonators can be cascaded in series. In other configurations, two or more optical ring resonators can be positioned in parallel between the input waveguides 212, 222 and the output waveguides 214, 224. The power tap, detector, circuitry, and heater are omitted from FIG. 3 for clarity, and can function in a manner similar to FIG. 2.

Figure 4:
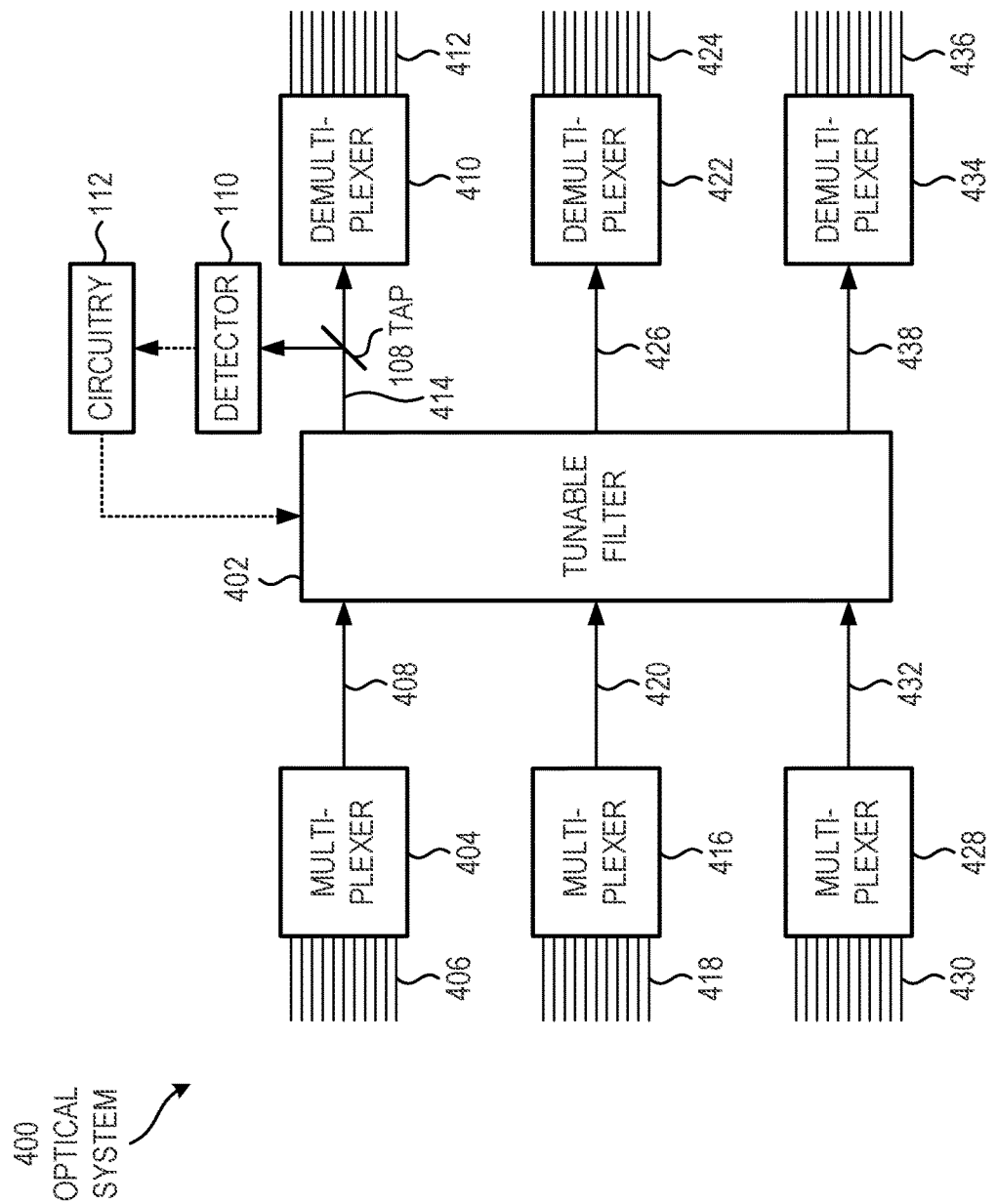
FIG. 4 is a block diagram showing another example of an optical system that can automatically spectrally filter multiple light signals to match a wavelength of another light signal, optionally with multiplexers and demultiplexers on its inputs and outputs, respectively, in accordance with some embodiments.

FIG. 4 is a block diagram showing another example of an optical system 400 that can automatically spectrally filter multiple light signals to match a wavelength of another light signal, optionally with multiplexers and demultiplexers on its inputs and outputs, respectively, in accordance with some embodiments. The configuration of FIG. 4 is but one example; other suitable configurations can also be used.

In some examples, the tunable filter 402 can further receive third input light and spectrally filter the third input light to form third output light, the third output light being spectrally filtered with a peak at the first wavelength and increasing attenuation at wavelengths away from the first wavelength. The tunable filter 402 can further extend the spectral filtering to fourth, fifth, and more than fifth input/outputs. In some examples, the tunable filter can automatically tune a plurality of input lights to the wavelength of a particular input light.

In some examples, optical system 400 can further include a first input multiplexer 404 configured to multiplex a plurality of inputs 406 into the first input light 408. In some of these examples, optical system 400 can further include a first output demultiplexer 410 configured to demultiplex a plurality of outputs 412 from the first output light 414. In some examples, optical system 400 can further include a second input multiplexer 416 configured to multiplex a plurality of inputs 418 into the second input light 420. In some of these examples, optical system 400 can further include a second output demultiplexer 422 configured to demultiplex a plurality of outputs 424 from the second output light 426. Any or all of these multiplexers or demultiplexers can use at least one of frequency-division multiplexing, time-division multiplexing, polarization-division multiplexing. In addition, any or all could use electrical modulation or electrical demodulation.

Similarly, in some examples, optical system 400 can further include a third input multiplexer 428 configured to multiplex a plurality of inputs 430 into the third input light 432. In some of these examples, optical system 400 can further include a third output demultiplexer 434 configured to demultiplex a plurality of outputs 436 from the third output light 438.

The multiplexers and demultiplexers are optional, and can applied to any or all of the inputs and/or outputs to the tunable filter 402.

Figure 5:
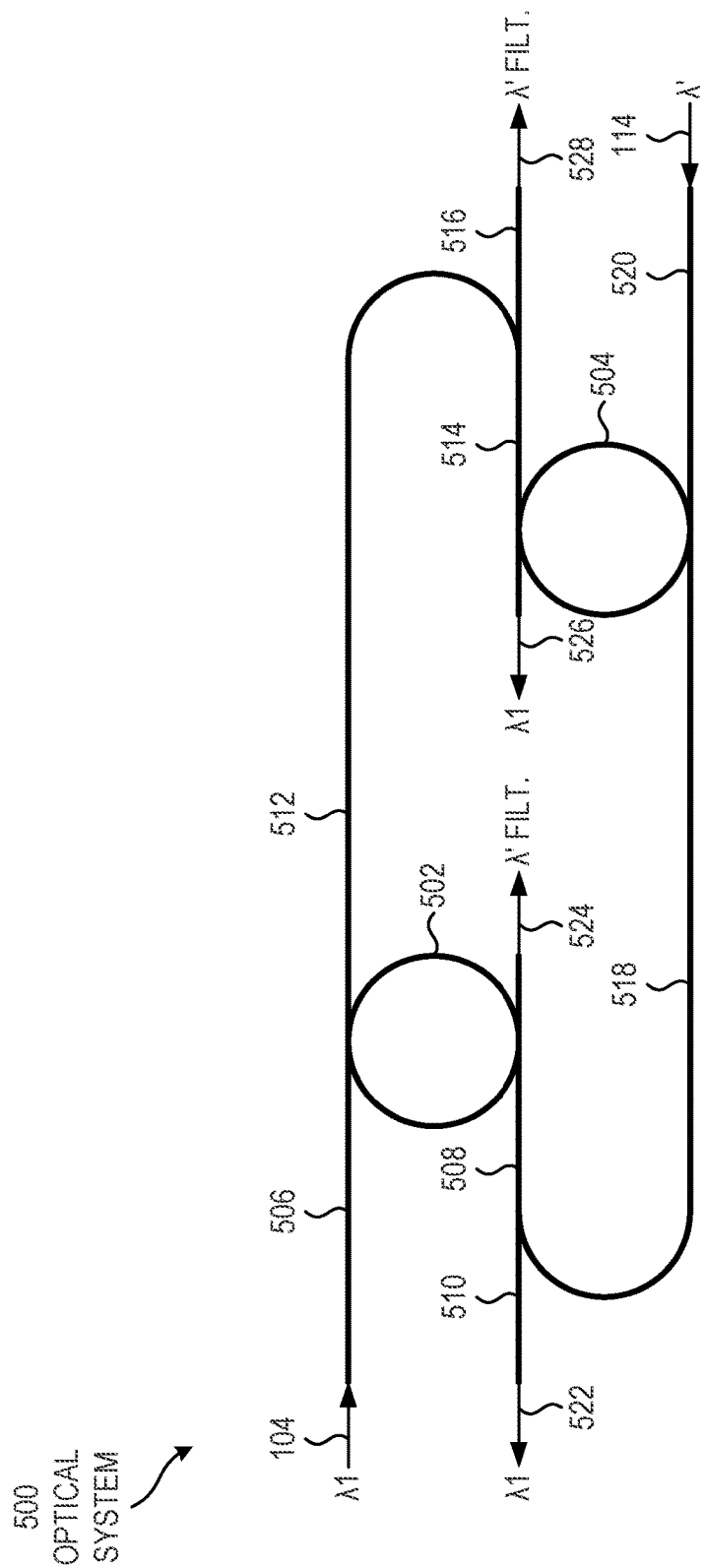
FIG. 5 is a block diagram showing a specific configuration of an optical system, including multiple optical ring resonators, in accordance with some embodiments.

FIG. 5 is a block diagram showing a specific configuration of an optical system 500, including multiple optical ring resonators 502, 504, in accordance with some embodiments. The configuration of FIG. 5 is but one example; other suitable configurations can also be used.

In the optical system 500, the optical ring resonators 502, 504 are incorporated into a network in a manner that blurs the distinction between purely input waveguides and purely output waveguides. As a result, the waveguides that provide the input light and output light are referred to simply as waveguides. As with the examples discussed above, two or more waveguides can be constructed as a single waveguide that contacts a ring resonator at a coupling region. The following description uses the terms left, right, top, bottom, clockwise and counter-clockwise only for convenience, with respect to the orientations shown in FIG. 5.

Waveguide 506 extends to the right and provides first input light 104 to a top of a first optical ring resonator 502 in a clockwise direction. Waveguide 512 extends to the right from the top of the first optical ring resonator 502. Waveguide 508 extends to the left from the bottom of the first optical ring resonator 502. Waveguide 510 extends to the left from a split in waveguide 508 to provide a first output light 522. Waveguide 512 loops downward to join waveguide 516 and extend to the left along waveguide 514. Waveguide 514 extends to the left to a top of second optical ring resonator 502 in a counter-clockwise direction. Second output light 526 extends to the left from the top of the second optical ring resonator 502. First and second output light 522, 526 are at the first wavelength, of the first input light 104. Waveguide 520 extends to the left and provides second input light 114 to a bottom of the second optical ring resonator 504 in a clockwise direction. Waveguide 518 extends to the left from the bottom of the second optical ring resonator 504. Third output light 524 extends to the right from the bottom of the first optical ring resonator 502. Fourth output light 516 extends to the right from the top of the second optical ring resonator 504. Third and fourth output light 524, 528 are spectrally filtered to match the first wavelength, of the first input light 104. Each splitting or joining of two waveguides can have a suitable splitting ratio (e.g., the ratio can be 50%, or another suitable value).

In some examples, optical ring resonators 502 and 504 can have different sizes, and, therefore different optical path lengths. As such, the differently-sized optical ring resonators 502 and 504 can form a Vernier filter. For example, to tune the filters to match wavelength λ1, the optical system 500 can tune the first optical ring resonator 502 to maximize the first output light 522. Next, the optical system 500 can tune the second optical ring resonator 504 to maximize the second output light 526. Next, for examples in which a source of the second input light 114 is tunable, the optical system 500 can tune the source to maximize the third output light 524. This is but one example; other suitable examples can also be used.

The configuration of FIG. 5 provides two outputs for each input. Other configurations can provide more than two outputs for each input.

Figure 6:
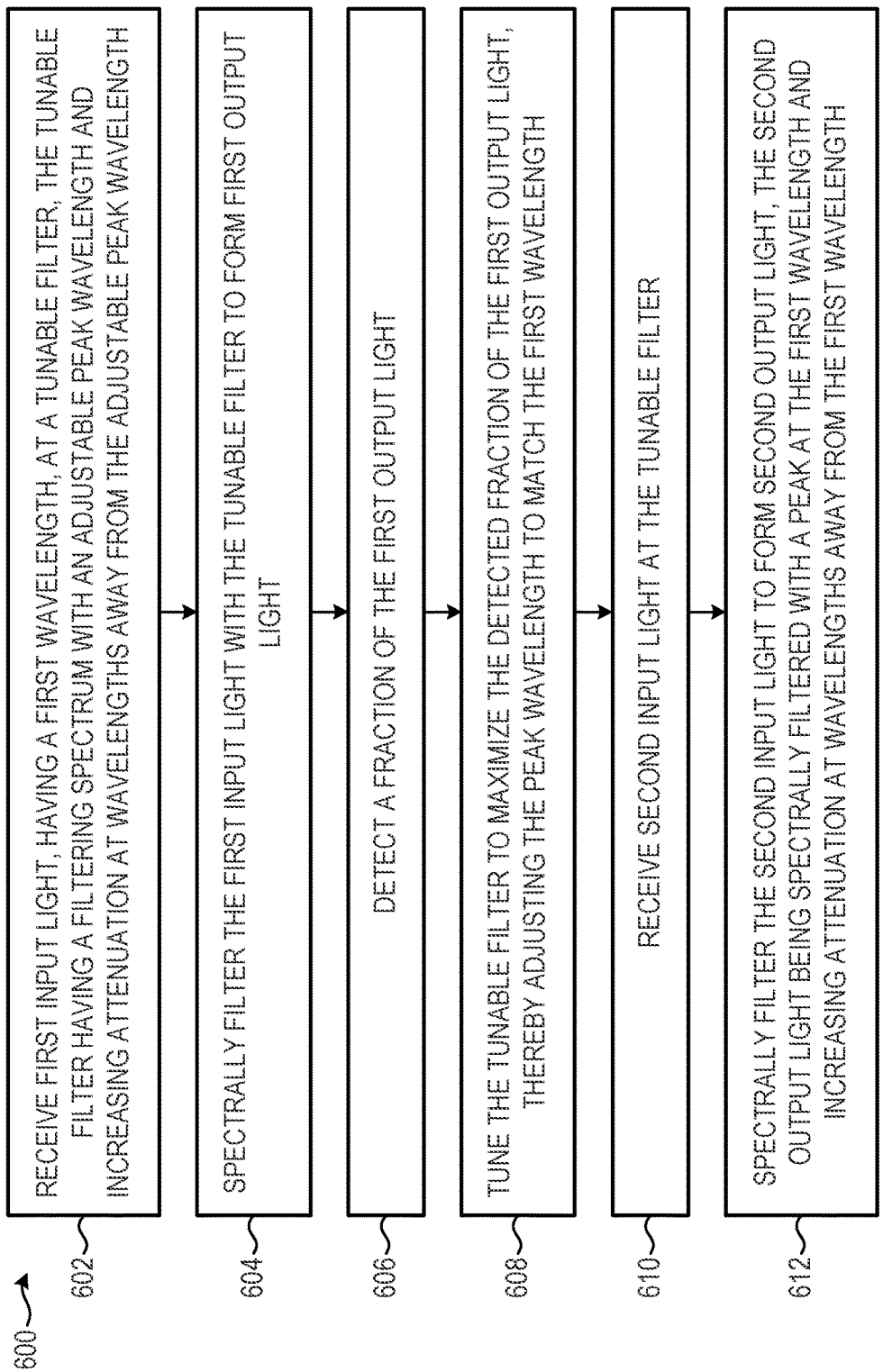
FIG. 6 is a flow chart showing an example of a method for automatically spectrally filtering one light signal to match a wavelength of another light signal, in accordance with some embodiments.

FIG. 6 is a flow chart showing an example of a method 600 for automatically spectrally filtering one light signal to match a wavelength of another light signal, in accordance with some embodiments. The method 600 can be executed by any suitable optical system with a tunable filter, such as 100, 200, 300, 400, 500, or another suitable optical system. The method 600 is but one example of a method 600 for automatically spectrally filtering one light signal to match a wavelength of another light signal; other suitable methods can also be used.

At operation 602, the optical system can receive first input light, having a first wavelength, at a tunable filter. The tunable filter can have a filtering spectrum with an adjustable peak wavelength and increasing attenuation at wavelengths away from the adjustable peak wavelength.

At operation 604, the optical system can spectrally filter the first input light with the tunable filter to form first output light.

At operation 606, the optical system can detect a fraction of the first output light.

At operation 608, the optical system can tune the tunable filter to maximize the detected fraction of the first output light, thereby adjusting the peak wavelength to match the first wavelength. In some examples, tuning the tunable filter to maximize the detected fraction of the first output light can include: heating at least a portion of a material having a temperature-dependent refractive index and positioned in an optical path of an optical ring resonator.

At operation 610, the optical system can receive second input light at the tunable filter.

At operation 612, the optical system can spectrally filter the second input light to form second output light, the second output light being spectrally filtered with a peak at the first wavelength and increasing attenuation at wavelengths away from the first wavelength.

In some examples, the method 600 can optionally further include multiplexing a plurality of inputs into the first input light; and demultiplexing a plurality of outputs from the first output light.

In some examples, the method 600 can optionally further include multiplexing a plurality of inputs into the second input light; and demultiplexing a plurality of outputs from the second output light.

Thus far, the description of the optical system and method have discussed receiving a light input at a first wavelength, tuning the tunable filter to match the first wavelength, and tuning a second light input with the tunable filter to leave only the first wavelength. In some examples, the optical system and method can further wavelength-tune the optical source that produces the second light input to maximize light passed through the tunable filter.

Figure 7:
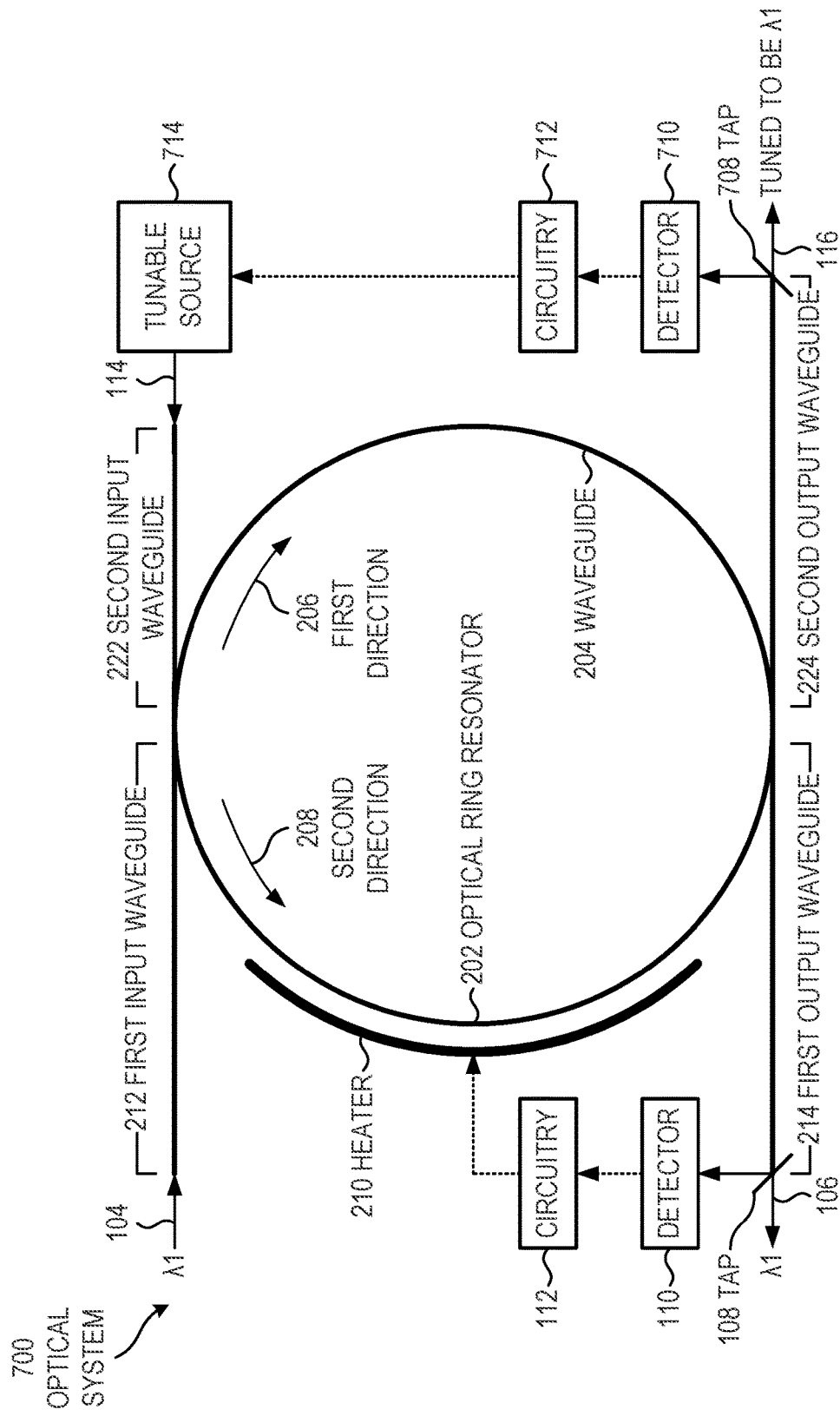
FIG. 7 is a block diagram showing another example of an optical system, in accordance with some embodiments.

FIG. 7 is a block diagram showing another example of an optical system 700, in accordance with some embodiments. The optical system 700 includes a tunable optical source 714, such as a tunable laser, which produces the second light input 114. In some examples, a power tap (not shown) can direct a fraction of light from the tunable optical source 714 to form the second light input 114, and direct a complementary fraction of light from the tunable optical source 714 to another location. Other suitable optical sources can also be used. The optical source can be positioned upstream to the second input waveguide 222, and can produce the second light input 114. In addition, the optical system 700 can include an additional optical tap 708 to direct a fraction of the second light output 116 onto an additional detector 710. Wavelength-tuning circuitry 712 can adjust the wavelength of the optical source to maximize the signal from the additional detector 710, and thereby tune the wavelength of the second input light 114 to match the peak wavelength of the optical ring resonator 202, which in turn is tuned to match the wavelength of the first input light 104. The wavelength-tuning circuitry 712 can be made integral with circuitry 112 or can be separate from circuitry 112. In the configuration of FIG. 7, other suitable ways to vary the optical path length of the optical ring resonator 202 can also be used.

Additionally, thus far, the optical ring resonators have been used to filter counter-propagating signals. For example, in FIG. 2, one signal propagates around the optical ring resonator 202 in a first direction 206, while a second signal propagates around the optical ring resonator 202 in a first direction 208. As an alternative configuration, both signals can propagate in the same direction. In this alternative configuration, the second input and output waveguides 222, 224 are swapped. In addition, to generate the servo signals that can drive the heater 210 (or drive another suitable tuning mechanism), the inputs can be modulated, so that only one of the first 104 or second 114 light inputs are on at any given time.

The preceding description includes discussion of figures having illustrations given by way of example of implementations of embodiments of the disclosure. The drawings should be understood by way of example, and not by way of limitation. As used herein, references to one or more "embodiments" are to be understood as describing a particular feature, structure, or characteristic included in at least one implementation of the disclosure. Thus, phrases such as "in one embodiment" or "in an alternate embodiment" appearing herein describe various embodiments and implementations of the disclosure, and do not necessarily all refer to the same embodiment. However, they are also not necessarily mutually exclusive.

Throughout this specification, several terms of art are used. These terms are to take on their ordinary meaning in the art from which they come, unless specifically defined herein or the context of their use would clearly suggest otherwise. In the preceding description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout the foregoing specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout the specification are not necessarily all referring to the same embodiment. Furthermore, the particular features, structures or characteristics may be combined in any suitable manner in one or more embodiments. In addition, it is appreciated that the figures provided are for explanation purposes to persons ordinarily skilled in the art and that the drawings are not necessarily drawn to scale. It is to be understood that the various regions, layers and structures of figures may vary in size and dimensions.

The above described embodiments of the disclosure may include discrete devices, or may be components of a photonic integrated circuit (PIC). PICs that consist of multiple photonic components offer many advantages over those that consist of discrete photonic devices, such as higher efficiency due to the removal of coupling losses between components, fewer packages and packaging steps, smaller size, and overall better performance.

The above-described embodiments of the disclosure may include SOI or silicon based (e.g., silicon nitride (SiN)) devices, or may include devices formed from both silicon and a non-silicon material. Said non-silicon material (alternatively referred to as "heterogeneous material") may include one of III-V material, magneto-optic material, or crystal substrate material.

III-V semiconductors have elements that are found in group III and group V of the periodic table (e.g., Indium Gallium Arsenide Phosphide (InGaAsP), Gallium Indium Arsenide Nitride (GaInAsN)). The carrier dispersion effects of III-V based materials may be significantly higher than in silicon based materials, as electron speed in III-V semiconductors is much faster than that in silicon. In addition, III-V materials have a direct bandgap which enables efficient creation of light from electrical pumping. Thus, III-V semiconductor materials enable photonic operations with an increased efficiency over silicon for both generating light and modulating the refractive index of light.

Thus, III-V semiconductor materials enable photonic operation with an increased efficiency at generating light from electricity and converting light back into electricity. The low optical loss and high quality oxides of silicon are thus combined with the electro-optic efficiency of III-V semiconductors in the heterogeneous optical devices described below. In embodiments of the disclosure, said heterogeneous devices utilize low loss heterogeneous optical waveguide transitions between the devices' heterogeneous and silicon-only waveguides.

Magneto-optic materials allow heterogeneous PICs to operate based on the magneto-optic (MO) effect. Such devices may utilize the Faraday Effect, in which the magnetic field associated with an electrical signal modulates an optical beam, offering high bandwidth modulation, and rotates the electric field of the optical mode enabling optical isolators. Said magneto-optic materials may include, for example, materials such as such as iron, cobalt, or yttrium iron garnet (YIG).

Crystal substrate materials provide heterogeneous PICs with a high electro-mechanical coupling, linear electro optic coefficient, low transmission loss, and stable physical and chemical properties. Said crystal substrate materials may include, for example, lithium niobate ($LiNbO_3$) or lithium tantalate ($LiTaO_3$).

In the foregoing detailed description, the method and apparatus of the present disclosure have been described with reference to specific exemplary embodiments thereof. It will, however, be evident that various modifications and changes may be made thereto without departing from the broader spirit and scope of the present disclosure. The present specification and figures are accordingly to be regarded as illustrative rather than restrictive.

What is claimed is:

1. An optical filter, comprising:
 a first optical ring resonator;
 a first input waveguide configured to deliver first light to the first optical ring resonator to propagate in a first direction around the first optical ring resonator;
 a second optical ring resonator;
 a first waveguide segment configured to deliver the first light from the first optical ring resonator to the second optical ring resonator to propagate in a second direction around the second optical ring resonator;
 a first output waveguide configured to propagate the first light away from the second optical ring resonator, the first light in the first output waveguide being spectrally filtered with a filtering spectrum that includes a peak wavelength and increasing attenuation at wavelengths away from the peak wavelength;
 a second input waveguide configured to deliver second light to the second optical ring resonator to propagate in a direction opposite the second direction around the second optical ring resonator;
 a second waveguide segment configured to deliver the second light from the second optical ring resonator to the first optical ring resonator to propagate in a direction opposite the first direction around the first optical ring resonator; and
 a second output waveguide configured to propagate the second light away from the first optical ring resonator, the second light in the second output waveguide being spectrally filtered with a filtering spectrum that includes the peak wavelength and increasing attenuation at wavelengths away from the peak wavelength.

2. The optical filter of claim 1, wherein:
 the first and second optical ring resonators are tunable; and
 the peak wavelength is adjustable, such that tuning at least one of the first and second optical ring resonators adjusts the peak wavelength.

3. The optical system of claim 2, further comprising:
 a first tap configured to direct a fraction of the first light out of the first waveguide segment;
 a first detector configured to detect at least a portion of the first light from the first tap; and
 first circuitry configured to tune the first optical ring resonator in response to a signal from the first detector.

4. The optical system of claim 3, wherein the first circuitry is configured to maximize a signal from the first detector to thereby tune a resonant wavelength of the first optical ring resonator to match a wavelength of the first light.

5. The optical system of claim 3, further comprising:
 a material having a temperature-dependent refractive index disposed in an optical path of the first optical ring resonator; and
 a heater configured to controllably heat at least a portion of the material,
 wherein the first circuitry is configured to tune the first optical ring resonator by selectively heating the portion of the material to thereby change an optical path length around the first optical ring resonator and thereby change a resonant wavelength of the first optical ring resonator.

6. The optical system of claim 3, further comprising:
 a material having a current-dependent refractive index via free-carrier absorption disposed in an optical path of the first optical ring resonator; and
 a first forward-biased PIN diode configured to controllably inject current into at least a portion of the material,
 wherein the first circuitry is configured to tune the first optical ring resonator by selectively injecting the current into the portion of the material to thereby change an optical path length around the first optical ring resonator and thereby change a resonant wavelength of the first optical ring resonator.

7. The optical system of claim 3, further comprising:
 a second tap configured to direct a fraction of the second light out of the second waveguide segment;
 a second detector configured to detect at least a portion of the second light from the second tap; and
 second circuitry configured to tune the second optical ring resonator in response to a signal from the second detector.

8. The optical system of claim 7, wherein the second circuitry is configured to maximize a signal from the second detector to thereby tune a resonant wavelength of the second optical ring resonator to match a wavelength of the second light.

9. The optical system of claim 1, wherein the first optical ring resonator and the second optical ring resonator, together, determine the peak wavelength such that an optical path length around the first optical ring resonator is an integral multiple of the peak wavelength, and an optical path length around the second optical ring resonator is an integral multiple of the peak wavelength.

10. The optical system of claim 9, wherein:
 the optical path length around the first optical ring resonator differs from the optical path length around the second optical ring resonator; and
 the first optical ring resonator and the second optical ring resonator, together, determine the adjustable peak wavelength via the Vernier effect.

11. The optical system of claim 9, wherein the optical path length around the first optical ring resonator is the same as the optical path length around the second optical ring resonator.

12. The optical system of claim 1, wherein the first input waveguide, the first optical ring resonator, the first waveguide segment, the second optical ring resonator, the first output waveguide, the second input waveguide, the second waveguide segment, and the second output waveguide are all positioned in a plane.

13. The optical system of claim 12, wherein:
 the second input waveguide is configured to deliver the second light to the second optical ring resonator to propagate in a third direction opposite the second direction around the second optical ring resonator;
 the second waveguide segment is configured to deliver the second light from the second optical ring resonator to the first optical ring resonator to propagate in a fourth direction opposite the first direction around the first optical ring resonator;

the first and third directions are clockwise; and
the second and fourth directions are counter-clockwise.

14. The optical system of claim 12, wherein:
the second input waveguide is configured to deliver the second light to the second optical ring resonator to propagate in a third direction opposite the second direction around the second optical ring resonator;
the second waveguide segment is configured to deliver the second light from the second optical ring resonator to the first optical ring resonator to propagate in a fourth direction opposite the first direction around the first optical ring resonator;
the first and third directions are counter-clockwise; and
the second and fourth directions are clockwise.

15. A method, comprising:
delivering first light from a first input waveguide to a first optical ring resonator;
propagating the first light in a first direction around the first optical ring resonator;
delivering the first light via a first waveguide segment from the first optical ring resonator to a second optical ring resonator;
propagating the first light in a second direction around the second optical ring resonator;
propagating the first light via a first output waveguide away from the second optical ring resonator, the first light in the first output waveguide being spectrally filtered with a filtering spectrum that includes a peak wavelength and increasing attenuation at wavelengths away from the peak wavelength;
delivering second light via a second input waveguide to the second optical ring resonator;
propagating the second light in a direction opposite the second direction around the second optical ring resonator;
delivering the second light via a second waveguide segment from the second optical ring resonator to the first optical ring resonator;
propagating the second light in a direction opposite the first direction around the first optical ring resonator; and
propagating the second light via a second output waveguide away from the first optical ring resonator, the second light in the second output waveguide being spectrally filtered with a filtering spectrum that includes the peak wavelength and increasing attenuation at wavelengths away from the peak wavelength.

16. The method of claim 15, further comprising:
tuning at least one of the first and second optical ring resonators to adjust the peak wavelength.

17. The method of claim 16, further comprising:
controllably heating at least a portion of material having a temperature-dependent refractive index disposed in an optical path of the first optical ring resonator, thereby changing an optical path length around the first optical ring resonator and thereby changing a resonant wavelength of the first optical ring resonator.

18. The method of claim 16, further comprising:
injecting current into at least a portion of material having a current-dependent refractive index via free-carrier absorption disposed in an optical path of the first optical ring resonator, thereby changing an optical path length around the first optical ring resonator and thereby changing a resonant wavelength of the first optical ring resonator.

19. The method of claim 16, further comprising:
detecting a fraction of the first light from the first waveguide segment; and
tuning the first optical ring resonator to maximize the detected fraction of the first light, to thereby tune a resonant wavelength of the first optical ring resonator to match a wavelength of the first light.

20. An optical filter, comprising:
a first tunable optical ring resonator;
a first input waveguide configured to deliver first light to the first tunable optical ring resonator to propagate in a first direction around the first tunable optical ring resonator;
a second tunable optical ring resonator;
a first waveguide segment configured to deliver the first light from the first tunable optical ring resonator to the second tunable optical ring resonator to propagate in a second direction around the second tunable optical ring resonator;
a first output waveguide configured to propagate the first light away from the second tunable optical ring resonator, the first light in the first output waveguide being spectrally filtered with a filtering spectrum that includes a peak wavelength and increasing attenuation at wavelengths away from the peak wavelength, wherein the tunable first optical ring resonator and the second tunable optical ring resonator, together, determine the peak wavelength such that an optical path length around the first tunable optical ring resonator is an integral multiple of the peak wavelength, and an optical path length around the second tunable optical ring resonator is an integral multiple of the peak wavelength, wherein the optical path length around the first optical ring resonator differs from the optical path length around the second optical ring resonator, wherein the first optical ring resonator and the second optical ring resonator, together, determine the adjustable peak wavelength via the Vernier effect;
a second input waveguide configured to deliver second light to the second tunable optical ring resonator to propagate in a direction opposite the second direction around the second tunable optical ring resonator;
a second waveguide segment configured to deliver the second light from the second tunable optical ring resonator to the first tunable optical ring resonator to propagate in a direction opposite the first direction around the first tunable optical ring resonator; and
a second output waveguide configured to propagate the second light away from the first tunable optical ring resonator, the second light in the second output waveguide being spectrally filtered with a filtering spectrum that includes the peak wavelength and increasing attenuation at wavelengths away from the peak wavelength;
wherein the first input waveguide, the first tunable optical ring resonator, the first waveguide segment, the second tunable optical ring resonator, the first output waveguide, the second input waveguide, the second waveguide segment, and the second output waveguide are all positioned in a plane.

* * * * *